June 18, 1940.  D. F. SEARLE  2,204,706
REMOTE CONTROLLED VACUUM BRAKE VALVE
Filed April 24, 1939
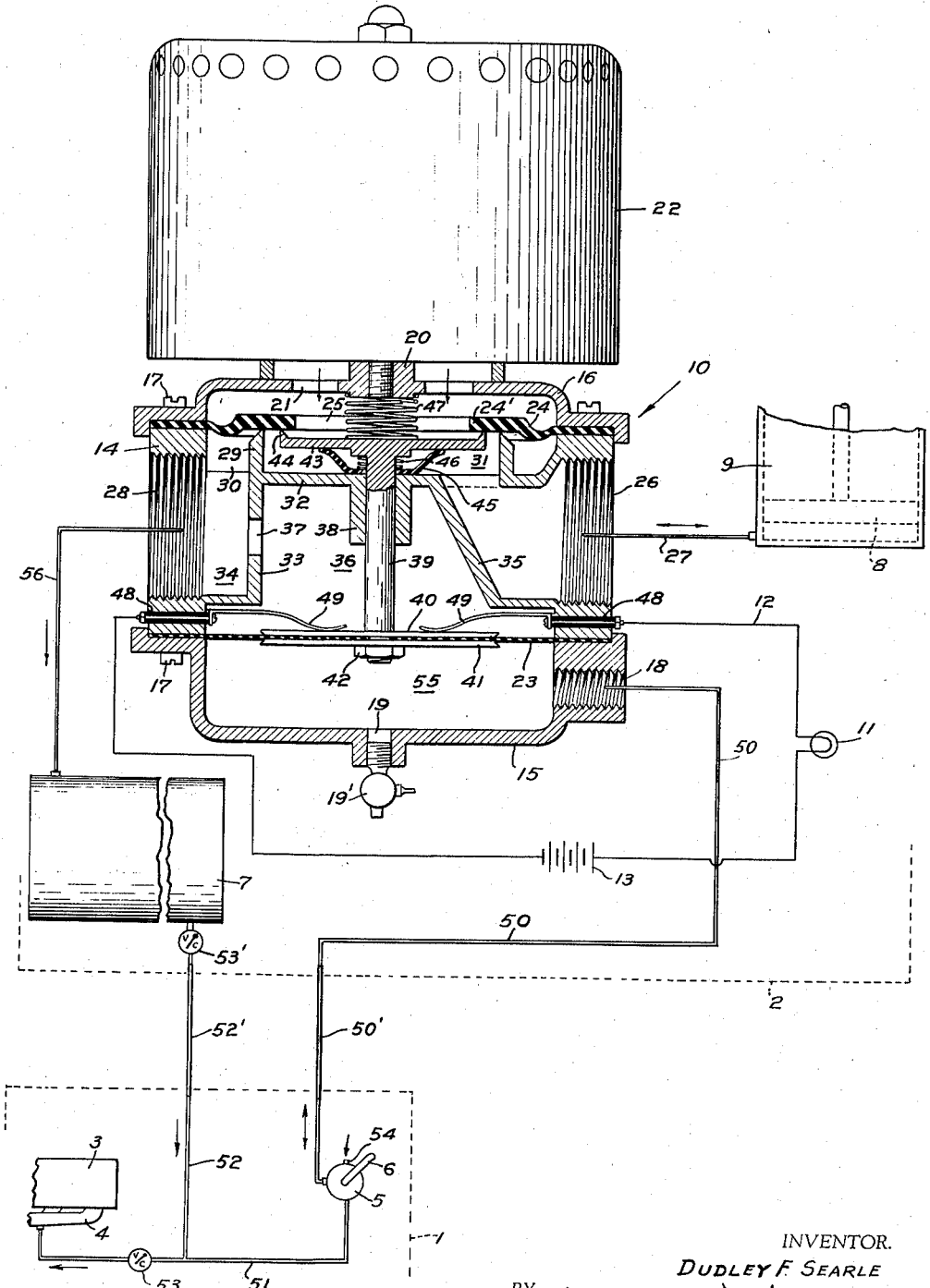
INVENTOR.
DUDLEY F. SEARLE
BY
ATTORNEY.

Patented June 18, 1940

2,204,706

UNITED STATES PATENT OFFICE 2,204,706

REMOTE CONTROLLED VACUUM BRAKE VALVE

Dudley F. Searle, Oakland, Calif.

Application April 24, 1939, Serial No. 269,555

5 Claims. (Cl. 303—31)

This invention relates to vacuum operated brakes particularly for trailer vehicles, and the principal object of the invention is to provide improvements in such apparatus contributing to simplicity, accessibility and reliability, as well as a construction which will include within a valve housing means for closing a stop signal light when the vacuum is applied for setting the brakes.

Other features and advantages of the construction will appear in the following description and accompanying drawing.

In the drawing:

The figure is a longitudinal or vertical central sectional view of one of my improved remote controlled vacuum brake valves shown about full size and with the cooperating elements of the braking system shown diagrammatically in operative relation to it.

In further detail 1 represents the towing automobile and 2 the trailer or road vehicle being towed. 3 is the engine on the towing car, 4 its intake or suction manifold, and 5 any common type of remote control vacuum valve for manual operation by the driver of the car by means of handle 6.

On the trailer is a storage vacuum tank 7 to provide sufficient vacuum capacity for operating all of the trailer brakes, 8 is one of the brake actuating or power pistons in its working or power cylinder 9 which upon exhaustion operates the piston and applies the brakes (not shown) to an extent depending on the degree of exhaustion applied and maintained by the remote controlled vacuum brake valve generally designated 10, and the moment an operative vacuum is induced within the power cylinder 9 the red stop light 11 is illuminated through closure of its electrical circuit 12 by the movement of parts within the valve structure. The battery for energizing the stop light circuit is indicated as carried by the trailer at 13, though it may be on the truck if desired.

The valve construction comprises a central hollow body 14 closed by a lower cover 15 and an upper cover 16 screwed or bolted around its margins thereto as indicated at 17. These three body parts are preferably circular in plan, and the lower or bottom cover has a tapped hole at 19 and a drain cock or plug at 19', while the upper cover 16 has a central hub 20 surrounded by air intake openings 21, and the hub supports above it any desired type of air filter 22 to filter outside air drawn through opening 21 in direction of the arrows when releasing the brakes.

Between both covers and the body portion of the valve are flexible diaphragms 23, 24 preferably of rubber, both being firmly clamped in place by the cover securing screws 17. The lower diaphragm 23 is imperforate, while the upper diaphragm is provided with a central opening 25 and is made somewhat thicker over its central area as at 24' where it forms an operative seal as will later be explained.

The hollow body portion 14 is provided with a tapped opening at 26 which connects with a pipe 27 or tube leading from the power cylinder 9, and at the opposite side with a tapped opening 28 which connects with a pipe 56 leading to storage vacuum tank 7.

Within the hollow body is a circular rim 29 forming an annular space 30 which is open at the left to pipe opening 28, and the circular space 31 within rim 29 is open at one side to pipe opening 26, while suitable partition walls 32, 33, 34, 35 separate the spaces mentioned as well as pipe openings 26 and 28 from a central chamber 36, though partition wall 33 is apertured at 37 to open the central chamber to pipe opening 28.

Horizontal wall 32 carries a central hub 38, and circular rim 29 is preferably tapered to a narrow ridge on top and normally impinges the under side of the thick portion 24' of diaphragm 24 to form a circular seal thereagainst.

Slidably guided within a bore in hub 38 is a valve stem 39 secured at its lower end to the center of diaphragm 23 through means of two metal washers 40—41 and nut 42, and at the upper end of the stem is a disk valve 43 formed with a beveled upstanding circular rim 44 which also impinges the under side of diaphragm 24 but along a concentric line spaced within rim 29, or between rim 29 and the edge of opening 25.

The stem 29 of the disk valve is sealed against leakage of air through its guiding hub 38 as by means of a thin flexible rubber cupped washer 45 resiliently contacting the under side of the disk valve and the upper side of horizontal partition 32 and this washer is preferably further resiliently urged to seat air tight against said partition by means of a light coiled spring 46.

As an upward movement of the disk valve will cause the brakes to be applied, it is biased in a downward direction by a coiled compression spring 47 reacting between hub 20 and the upper side of the valve disk.

The ends of circuit wires 12 pass through insulating sleeves 48 to central chamber 36 where they are each provided with spring contact terminals 49 adapted to contact with washer 40 to close the stop light circuit when the brakes are applied.

The piping of the elements includes a pipe 50 which includes a flexible hose section 50' extending from tapped opening 18 to the operator's valve 5, a pipe 51 from the operator's valve 5 to the source of vacuum 4 of the engine, and a pipe 52 which includes a flexible hose section 52' from the vacuum tank 7 to pipe 51 or the source of vacuum in advance of the operator's valve 5 so that tank 7 is always open to vacuum though check valved at 53 against admission of air or vapor to the tank when the engine is not running, and also check valved at 53' by a normally spring opened check valve adapted to close only upon breakage of line 52" but to remain open for operability of valve 5 when check valve 53 is closed during times when the engine is not running.

Operating valve 5 may be, as stated, any of the well known types of remote control valves by which any desired amount of rarefication can be induced in pipe 50 by moving the handle one way and leaving it at such position, or vice-versa to the point of entirely shutting off vacuum pipe 51 and opening pipe 50 to air intake port 54 to destroy or release the vacuum in chamber 55 below diaphragm 23 to atmospheric pressure.

My use of the word "vacuum" herein and in the claims is of course to be taken in its ordinarily accepted sense as meaning various degrees of negative pressure below atmospheric, and such terms as increasing, reducing, or releasing a vacuum etc. are to be understood in their popular sense.

In operation—with the arrangement of parts as described and assuming tank 7 to be under vacuum, and the brakes having been already applied so that power piston 8 is retracted, diaphragm 24' is sealed against both circular rims 29 and 44, and electric terminals are closed by disk 40 so that red stop light 11 is burning: As long as operating handle 6 is not moved the parts will all stay in the positions shown, as the power cylinder vacuum is sealed against any change of pressure by diaphragm valve 24' closing off any connection with vacuum tank 7 or air admission ports 21.

As there is a high vacuum in chamber 36 which is (under the showing of the drawing) just about counterbalanced by the vacuum in chamber 55 together with the springs, gravity and other forces acting on the flat valve member 43, any reduction of the vacuum in 55 by operating valve 5 will (by reason of the vacuum in chamber 36) lift diaphragm 40 and with it stem 39 and valve 43 to thereby lift diaphragm 24' from rim 29 and thereby open annular vacuum chamber 30 to pipe 27 and thereby increase the vacuum in the power cylinder 9 and apply the brakes with increased force, but as the increasing vacuum under central part of the diaphragm and flat valve 43 increases the effective outer air pressure to build up to a point where it forces the valve and diaphragm down again to balance the pressure in chamber 55 and again seal the parts in the position shown in the drawing with the brakes set under the increased force.

To release the brakes the operating valve handle 6 is moved to draw an increased vacuum in chamber 55 to thereby lower diaphragm 23, and valve disk 43 (due to the relatively increased air pressure above it) so that the valve rim 44 is out of sealing contact with the underside of diaphragm 24' and free air rushes in through the filter 22 and openings 21, 25, chamber 31 and through pipe 27 to power cylinder 9, and thus releases piston 8 so that the usual brake releasing springs can function.

If the vacuum in the power cylinder is only partially reduced by applying a low vacuum to chamber 55, the effective air pressure against the upper surface of the disk valve and inner portion of diaphragm 24' is also reduced so that the valve rises again to sealing position against the diaphragm to hold the parts in position shown at such pressure.

When the brakes are entirely released by applying a full vacuum to chamber 55, diaphragm 23 is forced down to break the stop light circuit through plate 40, and diaphragm 24' seats tightly on rim 29 to seal off vacuum chamber 30 from any connection with the power cylinder.

In case of an accident on the road resulting in the breaking away of the trailer, the fracturing of hose 52' will have no effect on the brakes as vacuum tank 7 is protected by check valve 53'. The simultaneous breaking of hose 50' will at once admit air to chamber 55 to lift the diaphragm valve 24 from the top of rim 29 to open vacuum chamber 30 to chamber 31 and at once apply full vacuum to the power cylinder and consequently lock the brakes under greatest pressure to stop the trailer and at the same time close the stop light circuit. Check valve 53' is "spring unloaded," that is, remains open during regular operation of the apparatus but will close instantly upon the pressure of the outside atmosphere being suddenly admitted to it, as by the breaking of hose 52', whereas check valve 53 is spring loaded to close while yielding to the suction of the engine. This latter valve will therefore close when the engine stops running, so as to leave a working vacuum in the system.

I am aware of prior remote controlled vacuum valves operating generally in the manner described, but believe the construction shown to have several distinct advantages as expressed within the scope of my appended claims.

I claim:

1. In a vacuum brake valve of the character described, a hollow body, a first and a second flexible diaphragm extending across the body at opposite ends thereof in sealed relation to the margins of said body, a partition intermediate the diaphragms forming a separate inner chamber within said body and closed on one side by the first diaphragm seated against a rim on said partition, a disk valve positioned within the confines of said rim arranged to seat at one side against said first diaphragm and provided with a stem, means securing the end of said stem to the second diaphragm, means supporting said stem for sliding at right angles to the plane of the diaphragms whereby said disk valve may be moved to lift said first diaphragm from seating on said rim, or moved in the opposite direction to be free of contact with said first diaphragm, a closed chamber at the outer side of said second diaphragm provided with a connection adapted for admission of varying air pressure to said closed chamber, two separate connections to the space in said body one open to the space outside of said partition and the other to the space within said partition, and an aperture in said first diaphragm within the area of said disk valve.

2. In a structure as set out in claim 1, means delivering filtered air through said aperture to said inner chamber when said valve is unseated.

3. In a structure as set out in claim 1, means mounting an air filter straddling the outer side of said first diaphragm for delivering air through said aperture to said inner chamber when said valve is unseated.

4. In a structure as set out in claim 1, said first diaphragm being formed of rubber-like material and of increased thickness over the general area contacted by said rim and said disk valve.

5. In a structure as set out in claim 1, means sealing the stem of said valve against leakage of air therealong while preserving its freedom to slide in supporting means.

DUDLEY F. SEARLE.